H. D., E. N. & C. T. WICKES.
Saw-Mills.
No. 153,873. Patented Aug. 4, 1874.
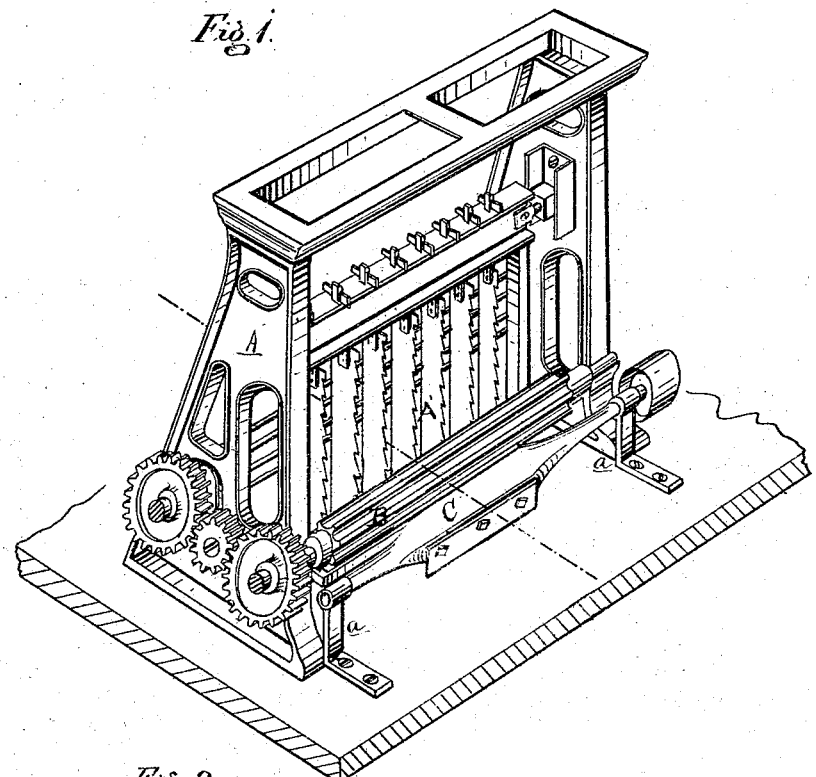
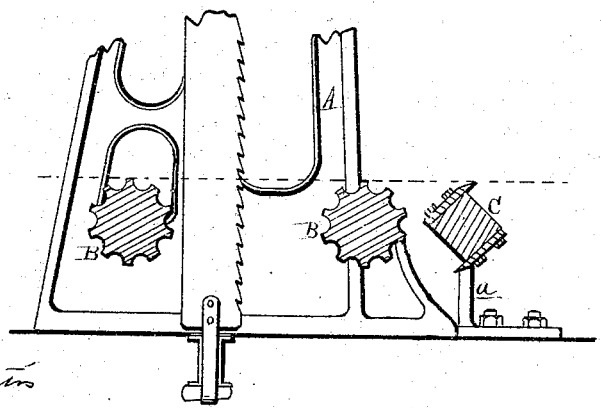

UNITED STATES PATENT OFFICE.

HENRY D. WICKES, EDWARD N. WICKES, AND CHARLES T. WICKES, OF EAST SAGINAW, MICHIGAN.

IMPROVEMENT IN SAW-MILLS.

Specification forming part of Letters Patent No. 153,873, dated August 4, 1874; application filed June 17, 1874.

*To all whom it may concern:*

Be it known that we, HENRY D. WICKES, EDWARD N. WICKES, and CHARLES T. WICKES, of East Saginaw, in the county of Saginaw and State of Michigan, have invented an Improvement in Saw-Mills, of which the following is a specification:

The object of our invention is to enable a round log to be put directly through a "flat" or "stock" gang saw-mill, and be converted into lumber, at one operation, without first being obliged to "slab" it or convert it into a "cant," as has heretofore been the case. Our invention consists in placing in front of the first feed-roll of a flat-gang a revolving cutter-head, which will plane or cut a flat surface on the under side of the log, as it is fed toward the saws, of sufficient width to have such a bearing upon the feed-rolls as will prevent the log from turning thereon.

Figure 1 is a perspective view, showing the application of our improvement to a flat-gang. Fig. 2 is a cross-section of the same.

In the drawing, A represents the frame of a flat-gang saw-mill, in the lower part of which the feed-rolls B B are journaled and geared together, by an intermediate gear, in the usual way. We journal a cutter-head, C, in suitable bearings at the top of standards a, in front of and parallel with the front feed-roll. The cutter-head carries two heavy planer-knives b, securely bolted thereto, and is driven at a rate of one thousand three hundred revolutions per minute, or thereabout, from any convenient source of power, preferably below the mill-floor. The top edges of the planer-knives are on an exact level with the feed-rolls at the highest point in their revolution. The log is run over a skid or head-block of ordinary construction, (not shown,) just in front of the cutter-head, and on a carriage at the tail end, the bar or head-block and carriage being just enough lower than the feed-rolls to permit the cutter-head to remove a portion of the log as it passes over it, cutting away enough of the timber to leave a flat space six to ten inches wide at the bottom of the log, which gives the log a firm bearing upon the feed-rolls, and prevents its turning thereon. The entire log is thus cut into boards. The supporting-bar moves forward with the log on two ways until the latter rests fairly on the first feed-roll, when the bar is dropped away from the log.

What we claim as our invention, and desire to secure by Letters Patent, is—

The combination of the gang-saws A' with the cutter-head C and feed-rolls B B, when constructed and operating in the manner substantially as herein shown and described, and for the purpose specified.

HENRY D. WICKES.
    EDWARD N. WICKES.
    CHARLES T. WICKES.

Witnesses:
 JOHN MCARTHUR,
 HERMAN B. ZWERT.